June 3, 1958 P. F. WALZ 2,837,663

MONOSTABLE TRIGGER CIRCUIT

Filed May 16, 1956

INVENTOR.
PAUL F. WALZ
BY F. H. Henson
AGENT

United States Patent Office 2,837,663

Patented June 3, 1958

2,837,663

MONOSTABLE TRIGGER CIRCUIT

Paul F. Walz, Rochester, N. Y., assignor to General Dynamics Corporation, Rochester, N. Y., a corporation of Delaware Application May 16, 1956, Serial No. 585,233

4 Claims. (Cl. 307—88.5)

This invention relates in general to trigger circuits and more particularly to monostable trigger circuits employing junction transistors.

The monostable trigger circuit which forms the subject matter of this invention is also shown and described in conjunction with the electronic telephone system disclosed in the copending application of Robert B. Trousdale, Serial No. 585,186, filed May 16, 1956, and assigned to the same assignee as the present invention. As used in the system disclosed in the above-identified application, the monostable circuit is utilized to generate a one hundred millisecond output pulse when triggered by a ten microsecond input pulse and the circuit is subject to being triggered by another input pulse shortly after the termination of each output pulse.

The junction transistor monostable circuits of the prior art are subject to the limitation that a relatively long time is required to restore the circuit to its stable condition after the circuit has generated an output pulse. The conventional monostable junction transistor trigger circuit of the prior art comprises a first transistor which is normally non-conductive and a second transistor which is normally conductive. A cross-coupling capacitor is connected between the collector of the first transistor and the base of the second transistor for the purpose of triggering the second transistor non-conductive and maintaining it non-conductive for a given period of time whenever the first transistor is triggered conductive. When the circuit is in its stable condition, the cross-coupling capacitor is charged between the potential of the base of the conducting second transistor and the potential of the collector supply voltage of the first transistor through the collector load resistor of the first transistor. After each operation of the circuit, the capacitor must charge completely before another trigger pulse is applied to the circuit if output pulses of uniform duration are to be produced by the circuit. When a circuit of this type is employed to generate an output pulse having a duration in the order of one hundred milliseconds, a charge time for the cross-coupling capacitor of ten milliseconds or more may be encountered.

Accordingly, it is the general object of this invention to provide a new and improved monostable trigger circuit.

It is a more particular object of this invention to provide a new and improved monostable trigger circuit which restores to its stable condition in a relatively short period of time after producing an output pulse.

The invention accomplishes the above cited objects by providing an alternate charge path for the cross-coupling capacitor, which path is completed only when the second or normally conducting transistor of the monostable circuit is conductive. Thus, the charge circuit has no effect on the collector circuit of the first transistor while the first transistor is conductive.

Further objects and advantages of the invention will become apparent as the following description proceeds, and the features of novelty which characterize the invention will be pointed out in particularity in the claims annexed to and forming a part of this specification.

For a better understanding of the invention, reference may be had to the accompanying drawing which comprises two figures on a single sheet.

Figure 1:
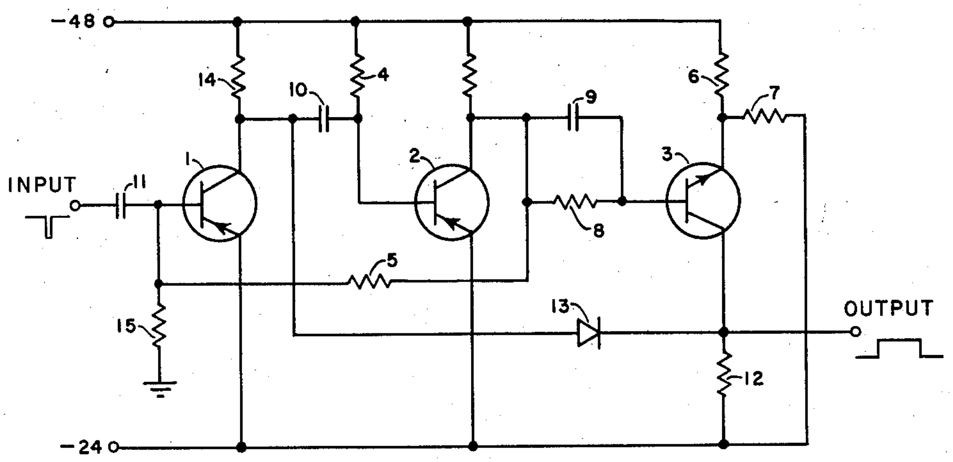
Fig. 1 shows a monostable trigger circuit and an inverter amplifier transistor.

The monostable trigger circuit has been shown as comprising PNP transistors 1 and 2, which may be type 2N44. The inverter amplifier transistor 3 has been shown as a NPN transistor and may be type GT692. It is to be understood that NPN transistors could be used in the monostable trigger circuit and a PNP transistor could be used as the inverter amplifier by a suitable reversal of polarity of the supply voltages and the input pulses.

In the stable condition of the circuit illustrated, transistor 1 is non-conductive and transistors 2 and 3 are conductive. Transistor 2 is conductive since its base, which is returned to minus forty-eight volts through resistor 4, is negative with respect to the minus twenty-four volt potential of its emitter. With transistor 2 conductive, the potential of its collector electrode stands at minus twenty-four volts. Transistor 1 is held non-conductive when the circuit is in its stable condition since its base is held slightly positive with respect to the minus twenty-four volt potential of its emitter. The base of transistor 1 is returned to the collector of transistor 2 through resistor 5 and to ground potential through resistor 15. NPN inverter amplifier transistor 3 is conductive at this time since its base is positive with respect to the approximately minus forty-four volt potential of its emitter as determined by the voltage division across emitter circuit resistors 6 and 7 which are returned to minus forty-eight volts and minus twenty-four volts, respectively. The base of transistor 3 is coupled to the collector of transistor 2 by resistor 8 and capacitor 9. Under these conditions, cross-coupling capacitor 10 has approximately twenty-four volts of charge applied thereto since it is connected between the collector of non-conducting transistor 1 and the base of conducting transistor 2. The charging path for capacitor 10 through diode 13 and conducting transistor 3 will be described in a subsequent paragraph since this path is effective only when the circuit is returning to its stable condition after being triggered into its unstable condition.

The circuit is triggered into its unstable state by the application of a negative trigger pulse to the base electrode of transistor 1 through coupling capacitor 11. Transistor 1 is rendered conductive by the applied trigger pulse and the potential of its collector rises from minus forty-eight volts to approximately minus twenty-four volts. The rise in potential at the collector of transistor 1 is transferred through capacitor 10 to the base of transistor 2 and serves to render transistor 2 non-conductive. As a result, the collector potential of transistor 2 drops toward minus forty-eight volts and transistor 1 is thereby held conductive through cross-coupling resistor 5. Transistor 3 is cut off when transistor 2 becomes non-conductive and the output signal from the inverter amplifier, which is taken from across collector load resistor 12, rises to approximately minus twenty-four volts. Diode 13 is biased for non-conduction at this time since its anode terminal, which is connected to the collector electrode of transistor 1, stands at minus twenty-four volts and its cathode terminal, which is connected to the collector electrode of transistor 3, also stands at minus twenty-four volts. Thus, the charging circuit for capacitor 10 is effectively disconnected from the collector circuit of transistor 1 during the period when transistor 1 is conductive.

The monostable circuit remains in its unstable state until capacitor 10 has discharged through resistor 4 to a sufficient extent to make the base of transistor 2 slightly negative with respect to the minus twenty-four volt potential of its emitter. When capacitor 10 is discharged to this point, transistor 2 becomes conductive and, because of the cross-coupling through resistor 5, transistor 1 is again rendered non-conductive. Transistor 3, of course, again becomes conductive when transistor 2 becomes conductive and the output signal appearing across collector load resistor 12 returns to approximately minus forty-four volts. Diode 13 is now biased for conduction and capacitor 10 recharges through diode 13 and through conducting transistor 3 to the voltage division across resistors 6 and 7. The resistance value of resistor 6 is much less than the resistance value of collector load resistor 14 so that capacitor 10 is charged in a much shorter period of time than it would be if diode 13 was not included in the circuit.

Figure 2:
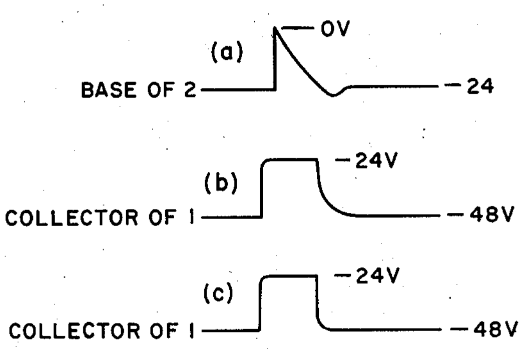
Fig. 2 shows the waveforms obtained at various points in the circuit of Fig. 1.

The waveforms appearing at the base of transistor 2 and at the collector of transistor 1 are graphically illustrated in Fig. 2 of the drawings. As illustrated in Fig. 2*a* and as previously described, the potential appearing at the base of transistor 2 rises twenty-four volts to approximately ground potential when transistor 1 is triggered conductive, transistor 2 is thereby rendered non-conductive, and remains non-conductive for the discharge time of capacitor 10 through resistor 4. Fig. 2*b* is a graphic illustration of the waveform appearing at the collector of transistor 1 when diode 13 is not provided in the circuit and capacitor 10 recharges to its initial stable condition of charge through collector load resistor 14. Fig. 2*c* is a graphic illustration of the waveform appearing at the collector of transistor 1 when diode 13 is included in the circuit.

Thus, it can be seen that by the inclusion of diode 13 between the collector of transistor 1 and the collector of transistor 3, means has been provided in the monostable circuit for quickly recharging capacitor 10 to its initial state of charge. The charging path is completed only when transistor 3 is conductive so that the charging path has no effect on the collector circuit of transistor 1 when transistor 1 is conductive.

An output pulse of approximately one hundred milliseconds duration is obtained from the disclosed circuit when the following values of circuit components are used:

| | | |
|---|---|---|
| R4 | ohms | 33,000 |
| R5 | do | 18,000 |
| R6 | do | 220 |
| R7 | do | 1,100 |
| R8 | do | 5,600 |
| R12 | do | 10,000 |
| R14 | do | 2,200 |
| R15 | do | 180,000 |
| C10 | microfarads | 4 |

While there has been disclosed what is at present considered to be the preferred embodiment of the invention, other modifications will readily occur to those skilled in the art. It is not, therefore, desired that the invention be limited to the specific arrangement shown and described, and it is intended to cover in the appended claims all such modifications as fall within the true spirit and scope of the invention.

What is claimed is:

1. A monostable trigger circuit comprising first and second transistors, each of said transistors having collector, emitter, and base electrodes, said trigger circuit being so arranged that said first transistor is nonconductive and said second transistor is conductive when said circuit is in its stable operated condition, means for applying a trigger pulse to the base electrode of said first transistor to thereby render said first transistor conductive, a capacitor connected between the collector electrode of said first transistor and the base electrode of said second transistor for triggering said second transistor non-conductive and for maintaining it nonconductive for a given period of time whenever said first transistor is triggered conductive, means for maintaining said first transistor conductive so long as said second transistor remains non-conductive, a first impedance element connected between the collector electrode of said first transistor and a source of potential, a second impedance element interposed in a connection adapted to be completed between the collector electrode of said first transistor and said source of potential, and means for completing said connection only when said second transistor is conductive.

2. A monostable trigger circuit comprising first and second transistors, each of said transistors having collector, emitter, and base electrodes, said trigger circuit being so arranged that said first transistor is non-conductive and said second transistor is conductive when said circuit is in its stable operated condition, means for applying a trigger pulse to the base electrode of said first transistor to thereby render said first transistor conductive, a capacitor connected between the collector electrode of said first transistor and the base electrode of said second transistor for triggering said second transistor non-conductive and for maintaining it non-conductive for a given period of time whenever said first transistor is triggered conductive, means for maintaining said first transistor conductive so long as said second transistor remains non-conductive, a first impedance element connected between the collector electrode of said first transistor and a source of potential, a charging circuit for said capacitor connected to the collector electrode of said first transistor, and means controlled by said second transistor for isolating said charging circuit from the collector electrode of said first transistor whenever said second transistor is non-conductive.

3. A monostable trigger circuit comprising first and second transistors, each of said transistors having collector, emitter, and base electrodes, said trigger circuit being so arranged that said first transistor is non-conductive and said second transistor is conductive when said circuit is in its stable operated condition, a capacitor connected between the collector electrode of said first transistor and the base electrode of said second transistor, an impedance element connected between the collector electrode of said first transistor and a source of potential, a charging circuit for said capacitor connected to the collector electrode of said first transistor, means for applying a trigger pulse to the base electrode of said first transistor to thereby render said first transistor conductive, said second transistor being rendered non-conductive by the charge on said capacitor when said first transistor is rendered conductive, means for maintaining said first transistor conductive so long as said first transistor remains non-conductive, means for disconnecting the charge circuit for said capacitor from the collector electrode of said first transistor so long as said second transistor is non-conductive, and means connected to the base electrode of said second transistor for discharging said capacitor to a value which renders said second transistor again conductive.

4. In combination, a monostable trigger circuit comprising first and second transistors of the same conductivity type, an inverter amplifier comprising a third transistor of opposite conductivity type, each of said transistors having collector, emitter, and base electrodes, said trigger circuit being so arranged that said first transistor is non-conductive and said second transistor is conductive when said circuit is in its stable operated condition, a first impedance element connected between the collector electrode of said first transistor and a source of potential, a second impedance element connected between the emitter of said third transistor and said source of potential, means for coupling the collector electrode of said second transistor to the base electrode of said third transistor, means for applying a trigger pulse to the base electrode of said first transistor to thereby render said first transistor conductive, a capacitor connected between the collector electrode of said first transistor and the base electrode of said second transistor for triggering said second transistor non-conductive and for maintaining it non-conductive for a given period of time whenever said first transistor is rendered conductive, means for maintaining said first transistor conductive so long as said second transistor is non-conductive, a unidirectional conducting device connected between the collector electrode of said first transistor and the collector electrode of said third transistor, said device being poled so as to permit current flow between said source of potential and the collector electrode of said first transistor through said second impedance element whenever said third transistor is conductive.

References Cited in the file of this patent

UNITED STATES PATENTS

| | | |
|---|---|---|
| 2,536,808 | Higinbotham | Jan. 2, 1951 |
| 2,550,116 | Grosdoff | Apr. 24, 1951 |